Oct. 13, 1936.         L. KIEFNER            2,057,648
                    SPREADING LOCK BOLT
                 Original Filed Sept. 24, 1935
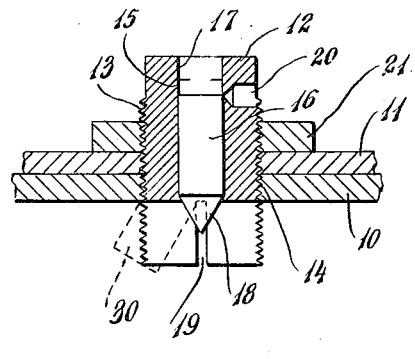
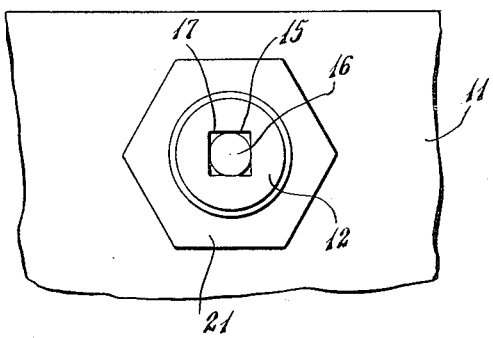
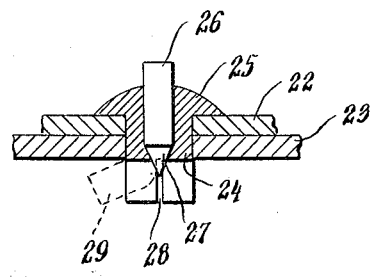
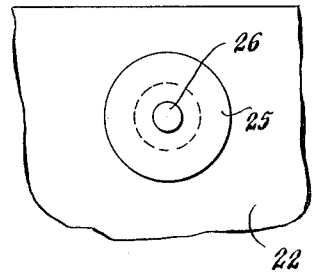
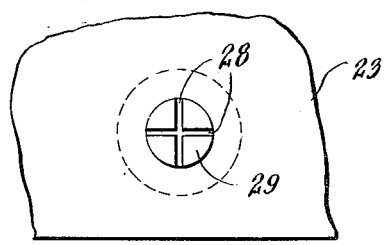
INVENTOR.
Leopold Kiefner
BY Emil Haun
ATTORNEYS.

Patented Oct. 13, 1936

2,057,648

UNITED STATES PATENT OFFICE 2,057,648

SPREADING LOCK BOLT

Leopold Kiefner, Irvington, N. J.

Application September 24, 1935, Serial No. 41,835
Renewed August 28, 1936

1 Claim. (Cl. 85—2)

The main object of this invention is to provide a bolt and rivet with means for spreading the smaller end of the same to couple members together in a permanent manner.

Another object of the invention is to provide a spreader bolt which comprises a threaded bolt or a rivet with means for spreading one end thereof to lock two members to each other.

The above and other objects will become apparent in the description below in which characters of reference refer to like-named parts in the drawing.

Referring briefly to the drawing Figure 1 is a longitudinal, sectional, elevational view of a threaded bolt, showing the means for spreading one end of said bolt.

Figure 2 is a top plan view of Figure 1.

Figure 3 is a longitudinal, sectional, elevational view thru a rivet showing the means for spreading one end thereof.

Figure 4 is a top plan view of Figure 3, and:

Figure 5 is a bottom plan view of Figure 3.

Referring in detail to the drawing the numerals 10 and 11, indicate the lower and the upper members which are to be secured to each other by means of a spreader bolt. The spreader bolt comprises a suitable circular body 12, having threads 13, continuing thruout the greater portion of its length. Openings are formed in members 10 and 11, are aligned and are provided with threads into which the bolt member 12, is threaded. The threads in the openings are indicated by the number 14. A circular opening 16, is formed axially in the bolt body 12, and is adapted to receive a spreader plunger 16. The upper portion of the circular opening 15, is formed into a square 17, in which a square shank of a wrench is received when it is desired to screw the body 12, into members 10 and 11. The lower end of the plunger 16, fits into a conical aperture 18, and is formed into a conical head. Intersecting slots 19, are formed in the lower end of the body 12, beneath the plate 10, and the fingers 30, between these slots are adapted to be spread by a plunger 16, when the latter is lowered by means of a hammer thrust. In order to lock the plunger 16, in place within the opening 15, a countersunk port 20, is provided which is adapted to receive a countersink and open the wall of the body 12, above the plunger 16. The body 12, is locked in place from one side by a nut 21.

In the rivet type of securement means members 22 and 23, represent an upper and lower member respectively. These two members are provided with aligned openings thru which the shank 24, of a rivet is passed. The rivet has a bolt head 25, and an axial opening into a conical headed plunger 26, is received. The conical head 27, of the plunger terminates and registers in a prepared similar seat in the region of intersecting slots 28, and the prongs formed by the slots are adapted to be spread outwardly as indicated by the numeral 29, in Figure 3.

The operation and use of the device is as follows: In the case of the bolt the body 12, is threaded into a threaded opening in members 10 and 11, the pin 16, is then inserted into the opening 15, and with a shank a pin 16, is urged downwardly by a hammer thrust, this spreads the prongs 30, and locks the body 12, in place in members 10 and 11. The lock 21, is attached to the body 12, on the upper surface of member 11. A countersink is then inserted into the opening 20, and by a hammer thrust the wall of the opening 15, is spread and locks the pin 16, in the opening 15, in the case of the rivet illustrated in Figure 3, the same procedure is gone thru. In this case the stud 26, is struck by a hammer deflecting the prongs 29, and spreading the same to locked position.

It is to be noted that certain changes in form and construction may be made without departing from the spirit and scope of the invention.

I claim:

In a device of the class described, a threaded body adapted to be threaded into an opening of two members, an opening in said body, a stud in said opening, said opening having a conical lower end, intersecting slots forming prongs at the lower end of said body, said stud when struck being adapted to spread said prongs to lock said body in said members, the upper end of said opening in said body being formed into a square aperture, said square aperture being adapted to receive a similarly dimensioned member for rotating said body and means for locking said stud in said body.

LEOPOLD KIEFNER.